(12) United States Patent
Petrovic et al.

(10) Patent No.: US 11,717,814 B2
(45) Date of Patent: Aug. 8, 2023

(54) CATALYTIC WASHCOAT WITH CONTROLLED POROSITY FOR $NO_x$ ABATEMENT

(71) Applicant: BASF Corporation, Florham Park, NJ (US)

(72) Inventors: Ivan Petrovic, Princeton, NJ (US);
Jaya L. Mohanan, Edison, NJ (US);
Joseph J. Petenko, Edison, NJ (US)

(73) Assignee: BASF CORPORATION, Florham Park, NJ (US)

( * ) Notice: Subject to any disclaimer, the term of this patent is extended or adjusted under 35 U.S.C. 154(b) by 791 days.

(21) Appl. No.: 16/620,116

(22) PCT Filed: Jun. 8, 2018

(86) PCT No.: PCT/IB2018/054171
§ 371 (c)(1),
(2) Date: Dec. 6, 2019

(87) PCT Pub. No.: WO2018/225036
PCT Pub. Date: Dec. 13, 2018

(65) Prior Publication Data
US 2020/0188895 A1 Jun. 18, 2020

Related U.S. Application Data

(60) Provisional application No. 62/517,243, filed on Jun. 9, 2017.

(51) Int. Cl.
*B01J 29/06* (2006.01)
*B01J 29/76* (2006.01)
(Continued)

(52) U.S. Cl.
CPC ........ *B01J 29/763* (2013.01); *B01D 53/9418* (2013.01); *B01J 29/061* (2013.01); *B01J 29/064* (2013.01); *B01J 29/072* (2013.01); *B01J 29/50* (2013.01); *B01J 29/52* (2013.01); *B01J 29/56* (2013.01); *B01J 29/7015* (2013.01); *B01J 29/7065* (2013.01); *B01J 29/72* (2013.01); *B01J 29/723* (2013.01); *B01J 29/80* (2013.01); *B01J 35/04* (2013.01); *B01J 35/1019* (2013.01); *B01J 35/1023* (2013.01); *B01J 35/1028* (2013.01); *C10G 29/16* (2013.01); *C10L 1/08* (2013.01); *C10L 10/02* (2013.01); *G01N 15/088* (2013.01); *B01D 2255/20738* (2013.01); *B01D 2255/20761* (2013.01); *B01D 2255/50* (2013.01); *B01D 2255/9155* (2013.01); *B01D 2255/9207* (2013.01); *B01J 2029/062* (2013.01);
(Continued)

(58) Field of Classification Search
CPC ........ B01J 29/763; B01J 29/72; B01J 29/061; B01J 2029/062; B01J 29/064; B01J 29/072; B01J 29/50; B01J 29/52; B01J 29/56; B01J 29/7015; B01J 29/7065; B01J 29/723; B01J 29/80; B01J 2229/186; B01J 2229/42; B01J 35/04; B01J 35/1019; B01J 35/1023; B01J 35/1028; B01D 53/9418; B01D 2255/20738; B01D 2255/20761; B01D 2255/50; B01D 2255/9155; B01D 2255/9207; B01D 2255/9022; G01N 15/088; C10L 1/08; C10L 10/02; C10L 2200/0446; C10L 2230/04; C10L 2270/026; C10G 29/16; C10G 2300/1055; C10G 2300/202; C10G 2400/04; Y02T 10/12; F01N 3/0222; F01N 3/2066; F01N 3/2828; F01N 2330/06; F01N 2370/04; F01N 2570/14
USPC .............. 502/60, 66, 67, 69, 73, 74, 527.19, 502/527.24
See application file for complete search history.

(56) References Cited

U.S. PATENT DOCUMENTS 4,544,538 A 10/1985 Zones
6,709,644 B2 3/2004 Zones et al.
(Continued)

FOREIGN PATENT DOCUMENTS

WO WO 2008/106519 9/2008
WO WO 2011/064186 6/2011

*Primary Examiner* — Elizabeth D Wood
(74) *Attorney, Agent, or Firm* — Baltazar Gomez

(57) ABSTRACT

The present disclosure recognizes a correlation between zeolitic surface area (ZSA) of a catalyst composition and its catalytic activity. Particularly, the disclosure provides catalyst articles for diesel $NO_x$ abatement, including a substrate and a washcoat layer containing metal-promoted molecular sieves, wherein the zeolitic surface area (ZSA) of the catalyst article is about 100 $m^2/g$ or greater, the volumetric surface area is about 900 $m^2/in^3$ or greater, and/or the total zeolitic surface area (tZSA) is about 1200 $m^2$ or greater. The disclosure further relates to methods for evaluating ZSA, volumetric ZSA, and tZSA, e.g., including the steps of coating a catalyst composition comprising metal-promoted molecular sieves onto a substrate; calcining and aging the catalyst composition; determining the ZSA (or volumetric ZSA or tZSA) thereof; and correlating the ZSA (or volumetric ZSA or tZSA) with catalyst composition $NO_x$ abatement activity to determine whether the catalyst composition is suitable for an intended use.

32 Claims, 4 Drawing Sheets

(51) Int. Cl.
- *B01D 53/94* (2006.01)
- *B01J 35/04* (2006.01)
- *B01J 35/10* (2006.01)
- *C10G 29/16* (2006.01)
- *C10L 1/08* (2006.01)
- *C10L 10/02* (2006.01)
- *G01N 15/08* (2006.01)
- *B01J 29/064* (2006.01)
- *B01J 29/52* (2006.01)
- *B01J 29/50* (2006.01)
- *B01J 29/72* (2006.01)
- *B01J 29/072* (2006.01)
- *B01J 29/70* (2006.01)
- *B01J 29/80* (2006.01)
- *B01J 29/56* (2006.01)

(52) U.S. Cl.
CPC ...... *B01J 2229/186* (2013.01); *B01J 2229/42* (2013.01); *C10G 2300/1055* (2013.01); *C10G 2300/202* (2013.01); *C10G 2400/04* (2013.01); *C10L 2200/0446* (2013.01); *C10L 2230/04* (2013.01); *C10L 2270/026* (2013.01)

(56) References Cited

U.S. PATENT DOCUMENTS

| | | | |
|---|---|---|---|
| 9,034,287 B2 | 5/2015 | Gerlach et al. | |
| 9,302,256 B2 | 4/2016 | Mohanan et al. | |
| 2005/0100494 A1 | 5/2005 | Yaluris et al. | |
| 2012/0329639 A1 | 12/2012 | Shu et al. | |
| 2014/0357476 A1* | 12/2014 | Bischof | B01J 35/1042 502/344 |
| 2017/0145887 A1 | 5/2017 | Bauer et al. | |

* cited by examiner

CATALYTIC WASHCOAT WITH CONTROLLED POROSITY FOR NO$_x$ ABATEMENT

CROSS-REFERENCE TO RELATED APPLICATIONS

The present application is a U.S. National Stage of International Patent Application PCT/IB2018/054171, filed Jun. 8, 2018, and claims priority to U.S. Provisional Patent Application No. 62/517,243, filed Jun. 9, 2017. The disclosures of each of the applications noted above are incorporated herein by reference in their entireties.

FIELD OF THE INVENTION

The present invention relates to catalyst compositions with controlled porosities, methods for the preparation and use of such catalyst compositions, and catalyst articles and systems employing such catalyst compositions.

BACKGROUND OF THE INVENTION

Over time, the harmful components of nitrogen oxides (NO$_x$) have led to atmospheric pollution. NO$_x$ is contained in exhaust gases, such as from internal combustion engines (e.g., in automobiles and trucks), from combustion installations (e.g., power stations heated by natural gas, oil, or coal), and from nitric acid production plants.

Various treatment methods have been used for the treatment of NO$_x$-containing gas mixtures to decrease atmospheric pollution. One type of treatment involves catalytic reduction of nitrogen oxides. There are two processes: (1) a nonselective reduction process wherein carbon monoxide, hydrogen, or a lower hydrocarbon is used as a reducing agent; and (2) a selective reduction process wherein ammonia or an ammonia precursor is used as a reducing agent. In the selective reduction process, a high degree of nitrogen oxide removal can be achieved with a small amount of reducing agent.

The selective reduction process is referred to as a SCR (Selective Catalytic Reduction) process. The SCR process uses catalytic reduction of nitrogen oxides with a reductant (e.g., ammonia) in the presence of atmospheric oxygen, resulting in the formation predominantly of nitrogen and steam:

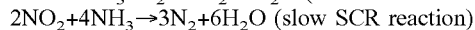
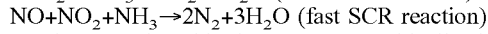

4NO+4NH$_3$+O$_2$→4N$_2$+6H$_2$O (standard SCR reaction)
2NO$_2$+4NH$_3$→3N$_2$+6H$_2$O (slow SCR reaction)
NO+NO$_2$+NH$_3$→2N$_2$+3H$_2$O (fast SCR reaction)

Catalysts employed in the SCR process ideally should be able to retain good catalytic activity over a wide range of temperature conditions of use, for example, 200° C. to 600° C. or higher, under hydrothermal conditions. SCR catalysts are commonly employed in hydrothermal conditions, such as during the regeneration of a soot filter, a component of the exhaust gas treatment system used for the removal of particles.

Molecular sieves such as zeolites have been used in the selective catalytic reduction (SCR) of nitrogen oxides with a reductant such as ammonia, urea, or a hydrocarbon in the presence of oxygen. Zeolites are crystalline materials having rather uniform pore sizes which, depending upon the type of zeolite and the type and amount of cations included in the zeolite lattice, range from about 3 to about 10 Angstroms in diameter. Zeolites having 8-ring pore openings and double-six ring secondary building units, particularly those having cage-like structures, have recently been studied for use as SCR catalysts. A specific type of zeolite having these properties is chabazite (CHA), which is a small pore zeolite with 8 member-ring pore openings (~3.8 Angstroms) accessible through its 3-dimensional porosity. A cage-like structure results from the connection of double six-ring building units by 4 rings.

Metal-promoted zeolite catalysts including, among others, iron-promoted and copper-promoted zeolite catalysts, for the selective catalytic reduction of nitrogen oxides with ammonia are known. For example, iron-promoted zeolite beta has been an effective commercial catalyst for the selective reduction of nitrogen oxides with ammonia, e.g., as described in U.S. Pat. No. 4,961,917. There is always a desire for improved performance of catalysts and, accordingly, it would be beneficial to provide SCR catalysts with improved low and/or high temperature performance.

SUMMARY OF THE INVENTION

The invention provides catalyst compositions comprising zeolite-containing washcoats exhibiting controlled microporosities. Such microporosities can be described, e.g., by the zeolitic surface area (ZSA) of the washcoats. The specific microporosity of a given catalyst composition and, in particular, the microporosity of a catalyst composition in calcined and aged form, can affect the activity of that composition. The present disclosure provides a correlation between microporosity values and SCR activity. For example, increased microporosity of a washcoat (e.g., as defined by a relatively high ZSA) can be beneficial for low temperature (e.g., 200° C.) performance in diesel exhaust NO$_x$ abatement. In certain aspects, the disclosure provides a catalyst article for diesel NO$_x$ abatement, comprising: a substrate and a washcoat layer coated on the substrate, wherein the washcoat layer comprises metal-promoted molecular sieves, and wherein the zeolitic surface area (ZSA) of the catalyst article is about 100 m$^2$/g or greater. The ZSA can, in some embodiments, be about 120 m$^2$/g or greater or about 130 m$^2$/g or greater. In some embodiments, the ZSA is about 100 m$^2$/g to about 600 m$^2$/g, or about 130 m$^2$/g to about 500 m$^2$/g, or about 140 m$^2$/g to about 450 m$^2$/g, or about 150 m$^2$/g to about 400 m$^2$/g, or about 160 m$^2$/g to about 350 m$^2$/g, or about 120 m$^2$/g to about 250 m$^2$/g. In some embodiments, the ZSA is about 120 m$^2$/g to about 200 m$^2$/g.

In certain aspects, the disclosure provides a catalyst article for diesel NO$_x$ abatement, comprising: a substrate and a washcoat layer coated on the substrate, wherein the washcoat layer comprises metal-promoted molecular sieves, and wherein the volumetric zeolitic surface area of the catalyst article is about 900 m$^2$/in$^3$ or greater. The volumetric zeolitic surface area can, in some embodiments, be about 1000 m$^2$/in$^3$ or greater or about 1500 m$^2$/in$^3$ or greater. In some embodiments, the volumetric zeolitic surface area is about 900 m$^2$/in$^3$ to about 5100 m$^2$/in$^3$, or about 1600 to about 3700 m$^2$/in$^3$, or about 1650 to about 3600 m$^2$/in$^3$, or about 1700 to about 3500 m$^2$/in$^3$, or about 1750 to about 3400 m$^2$/in$^3$, or about 1800 to about 3300 m$^2$/in$^3$, or about 1850 to about 3200 m$^2$/in$^3$, or about 900 m$^2$/in$^3$ to about 2300 m$^2$/in$^3$. In still further embodiments, the volumetric zeolitic surface area is about 1100 m$^2$/in$^3$ to about 2000 m$^2$/in$^3$, 1100 m$^2$/in$^3$ to about 2300 m$^2$/in$^3$ or about 1500 m$^2$/in$^3$ to about 2300 m$^2$/in$^3$.

In certain aspects, the disclosure provides a catalyst article for diesel NO$_x$ abatement, comprising: a substrate; and a washcoat layer coated on the substrate, wherein the washcoat layer comprises metal-promoted molecular sieves, and wherein the total zeolitic surface area (tZSA) of the catalyst article is about 1200 m² or greater. The tZSA can, in some embodiments, be about 1500 m² or greater, about 2000 m²/g or greater, or about 2200 m²/g or greater. In some embodiments, the tZSA is about 1000 to about 6600 m², or about 2000 to about 4800 m², or about 2200 to about 4500 m², or about 2300 to about 4300 m², or about 2500 to about 3900 m², or about 1200 m² to about 3000 m². In further embodiments, the tZSA is about 1500 m² to about 3000 m², or about 2000 m² to about 3000 m².

In various embodiments, the metal-promoted molecular sieves of the disclosed catalyst articles comprise copper-promoted molecular sieves. The amount of copper can vary and includes, but is not limited to, embodiments wherein the copper-promoted molecular sieves comprise about 0.1 wt. % or more copper, calculated as copper oxide or wherein the copper-promoted molecular sieves comprise about 0.1 wt. % to about 7 wt. % copper, calculated as copper oxide. In some embodiments, the metal-promoted molecular sieves comprise molecular sieves promoted with copper and a second, different metal. The second, different metal, in certain embodiments, is selected from the group consisting of iron, cerium, zinc, strontium, and calcium. In one embodiment, the metal-promoted molecular sieves comprise copper- and iron-promoted molecular sieves.

The metal-promoted molecular sieves may have varying structures, and in some embodiments, the metal-promoted molecular sieves have a zeolitic structure type selected from the group consisting of AEI, AFT, AFV, AFX, AVL, CHA, DDR, EAB, EEI, ERI, IFY, IRN, KFI, LEV, LTA, LTN, MER, MWF, NPT, PAU, RHO, RTE, RTH, SAS, SAT, SAV, SFW, TSC, UFI, and combinations thereof. In particular embodiments, the metal-promoted molecular sieves have a zeolitic structure type of CHA. The CHA structure, in some embodiments, is selected from the group consisting of SSZ-13, SSZ-62, natural chabazite, zeolite K-G, Linde D, Linde R, LZ-218, LZ-235, LZ-236, ZK-14, SAPO-34, SAPO-44, SAPO-47, and ZYT-6.

The washcoat layer loading can vary. In some embodiments, the washcoat layer is present with a loading of about 0.5 g/in³ to about 6 g/in³, in some embodiments, the washcoat layer is present with a loading of about 0.5 g/in³ to about 3.5 g/in³, in some embodiments, the washcoat layer is present with a loading of about 1 g/in³ to about 5 g/in³, and in some embodiments, the washcoat layer is present with a loading of about 1 g/in³ to about 3 g/in³. The substrate of the disclosed catalyst articles can, in certain embodiments, be a flow-through honeycomb substrate or a wall flow filter substrate.

In certain embodiments, the disclosed catalyst articles are effective to provide a $NO_x$ conversion of about 70% or greater at 200° C. In certain embodiments, the disclosed catalyst articles are effective to provide a $NO_x$ conversion of about 75% or greater at 200° C. In certain embodiments, the disclosed catalyst articles are effective to provide a $NO_x$ conversion of about 80% or greater at 200° C. In some embodiments, the disclosed catalyst articles are in aged form such that the catalyst article has been aged at a temperature of at least 400° C. for at least 2 hours.

The disclosure additionally provides a method of measuring surface area (e.g., BET and/or ZSA) of a selective catalytic reduction (SCR) catalyst composition for diesel $NO_x$ abatement, comprising: obtaining a catalyst composition comprising metal-promoted molecular sieves; coating the catalyst composition onto a substrate; calcining and aging the catalyst composition to give a catalyst article; and determining the zeolitic surface area (ZSA) of the calcined and aged catalyst composition in intact form (i.e., on the substrate) by subjecting the catalyst article in whole/uncrushed form to physisorption analysis and using partial pressure points and gas absorption at each of the partial pressure points to calculate the ZSA. The methods disclosed herein may, in some embodiments, further comprise correlating the ZSA with catalyst composition $NO_x$ abatement activity to determine whether the catalyst composition is suitable for an intended use. Such methods are understood to be relevant in the context of tZSA and volumetric ZSA as well.

In a further aspect, the present disclosure provides a method of evaluating the activity of a selective catalytic reduction (SCR) catalyst composition for diesel $NO_x$ abatement, comprising: obtaining a catalyst composition comprising metal-promoted molecular sieves; coating the catalyst composition onto a substrate; calcining and aging the catalyst composition; determining the zeolitic surface area (ZSA) of the calcined and aged catalyst composition; and correlating the ZSA with catalyst composition $NO_x$ abatement activity to determine whether the catalyst composition is suitable for an intended use. The disclosure additionally provides a method of measuring $NO_x$ abatement activity of a selective catalytic reduction (SCR) catalyst composition, comprising: obtaining a catalyst composition comprising metal-promoted molecular sieves; coating the catalyst composition onto a substrate; calcining and aging the catalyst composition; determining the zeolitic surface area (ZSA) of the calcined and aged catalyst composition in intact form; and correlating the ZSA to catalyst $NO_x$ abatement activity to determine whether the catalyst composition is suitable for an intended use. Again, these methods are understood to be relevant in the context of tZSA and volumetric ZSA as well. The intended use of the composition can be, in some embodiments, use of the catalyst composition at a particular temperature (e.g., use at low temperature, such as about 200° C.). In some embodiments, particular ZSA values are correlated with high SCR activity, particularly at low temperature. SCR catalyst compositions, catalysts, exhaust emission treatment systems, and methods of reducing $NO_x$ in exhaust gases (e.g., diesel exhaust gases) using such catalyst compositions and catalysts are also described herein.

The present disclosure includes, without limitation, the following embodiments.

Embodiment 1

A catalyst article for diesel $NO_x$ abatement, comprising: a substrate; and a washcoat layer coated on the substrate, wherein the washcoat layer comprises metal-promoted molecular sieves, and wherein the zeolitic surface area (ZSA) of the catalyst article is about 100 m²/g or greater.

Embodiment 2

The catalyst article of the preceding embodiment, wherein the ZSA of the catalyst article is about 120 m²/g or greater.

Embodiment 3

The catalyst article of any preceding embodiment, wherein the ZSA of the catalyst article is about 130 m²/g or greater.

Embodiment 4

The catalyst article of any preceding embodiment, wherein the ZSA of the catalyst article is about 100 m²/g to about 600 m²/g, or about 130 m²/g to about 500 m²/g, or about 140 m²/g to about 450 m²/g, or about 150 m²/g to about 400 m²/g, or about 160 m²/g to about 350 m²/g, or about 120 m²/g to about 250 m²/g.

Embodiment 5

The catalyst article of any preceding embodiment, wherein the ZSA of the catalyst article is about 120 m²/g to about 200 m²/g.

Embodiment 6

A catalyst article for diesel $NO_x$ abatement, comprising: a substrate; and a washcoat layer coated on the substrate, wherein the washcoat layer comprises metal-promoted molecular sieves, and wherein the volumetric zeolitic surface area of the catalyst article is about 900 m²/in³ or greater.

Embodiment 7

The catalyst article of any preceding embodiment, wherein the volumetric zeolitic surface area of the catalyst article is about 1000 m²/in³ or greater.

Embodiment 8

The catalyst article of any preceding embodiment, wherein the volumetric zeolitic surface area of the catalyst article is about 1500 m²/in³ or greater.

Embodiment 9

The catalyst article of any preceding embodiment, wherein the volumetric zeolitic surface area of the catalyst article is about 900 m²/in³ to about 5100 m²/in³, or about 1600 to about 3700 m²/in³, or about 1650 to about 3600 m²/in³, or about 1700 to about 3500 m²/in³, or about 1750 to about 3400 m²/in³, or about 1800 to about 3300 m²/in³, or about 1850 to about 3200 m²/in³, or about 900 m²/in³ to about 2300 m²/in³.

Embodiment 10

The catalyst article of any preceding embodiment, wherein the volumetric zeolitic surface area of the catalyst article is about 1100 m²/in³ to about 2300 m²/in³.

Embodiment 11

The catalyst article of any preceding embodiment, wherein the volumetric zeolitic surface area of the catalyst article is about 1500 m²/in³ to about 2300 m²/in³.

Embodiment 12

A catalyst article for diesel $NO_x$ abatement, comprising: a substrate; and a washcoat layer coated on the substrate, wherein the washcoat layer comprises metal-promoted molecular sieves, and wherein the total zeolitic surface area (tZSA) of the catalyst article is about 1200 m² or greater.

Embodiment 13

The catalyst article of any preceding embodiment, wherein the tZSA of the catalyst article is about 1500 m² or greater.

Embodiment 14

The catalyst article of any preceding embodiment, wherein the tZSA of the catalyst article is about 2000 m² or greater.

Embodiment 15

The catalyst article of any preceding embodiment, wherein the tZSA of the catalyst article is about 2200 m² or greater.

Embodiment 16

The catalyst article of any preceding embodiment, wherein the tZSA of the catalyst article is about 1000 to about 6600 m², or about 2000 to about 4800 m², or about 2200 to about 4500 m², or about 2300 to about 4300 m², or about 2500 to about 3900 m², or about 1200 m² to about 3000 m².

Embodiment 17

The catalyst article of any preceding embodiment, wherein the tZSA of the catalyst article is about 1500 m² to about 3000 m².

Embodiment 18

The catalyst article of any preceding embodiment, wherein the tZSA of the catalyst article is about 2000 m² to about 3000 m².

Embodiment 19

The catalyst article of any preceding embodiment, wherein the metal-promoted molecular sieves comprise copper-promoted molecular sieves.

Embodiment 20

The catalyst article of any preceding embodiment, wherein the copper-promoted molecular sieves comprise about 0.1 wt. % or more copper, calculated as copper oxide.

Embodiment 21

The catalyst article of any preceding embodiment, wherein the copper-promoted molecular sieves comprise about 0.1 wt. % to about 7 wt. % copper, calculated as copper oxide.

Embodiment 22

The catalyst article of any preceding embodiment, wherein the metal-promoted molecular sieves comprise molecular sieves promoted with copper and a second, different metal.

Embodiment 23

The catalyst article of any preceding embodiment, wherein the second, different metal is selected from the group consisting of iron, cerium, zinc, strontium, and calcium.

Embodiment 24

The catalyst article of any preceding embodiment, wherein the metal-promoted molecular sieves comprise copper- and iron-promoted molecular sieves.

Embodiment 25

The catalyst article of any preceding embodiment, wherein the metal-promoted molecular sieves have a zeolitic structure type selected from the group consisting of AEI, AFT, AFV, AFX, AVL, CHA, DDR, EAB, EEI, ERI, IFY, IRN, KFI, LEV, LTA, LTN, MER, MWF, NPT, PAU, RHO, RTE, RTH, SAS, SAT, SAV, SFW, TSC, UFI, and combinations thereof.

Embodiment 26

The catalyst article of any preceding embodiment, wherein the metal-promoted molecular sieves have a zeolitic structure type of CHA.

Embodiment 27

The catalyst article of any preceding embodiment, wherein the CHA structure type is selected from the group consisting of SSZ-13, SSZ-62, natural chabazite, zeolite K-G, Linde D, Linde R, LZ-218, LZ-235, LZ-236, ZK-14, SAPO-34, SAPO-44, SAPO-47, and ZYT-6.

Embodiment 28

The catalyst article of any preceding embodiment, wherein the washcoat layer is present with a loading of about 0.5 g/in$^3$ to about 6 g/in$^3$.

Embodiment 29

The catalyst article of any preceding embodiment, wherein the washcoat layer is present with a loading of about 0.5 g/in$^3$ to about 3.5 g/in$^3$.

Embodiment 30

The catalyst article of any preceding embodiment, wherein the washcoat layer is present with a loading of about 1 g/in$^3$ to about 5 g/in$^3$.

Embodiment 31

The catalyst article of any preceding embodiment, wherein the washcoat layer is present with a loading of about 1 g/in$^3$ to about 3 g/in$^3$.

Embodiment 32

The catalyst article of any preceding embodiment, wherein the substrate is a flow-through honeycomb substrate.

Embodiment 33

The catalyst article of any preceding embodiment, wherein the substrate is a wall flow filter substrate.

Embodiment 34

The catalyst article of any preceding embodiment, wherein the catalyst article is effective to provide a NO$_x$ conversion of about 70% or greater at 200° C. or about 80% or greater at 200° C.

Embodiment 35

The catalyst article of any preceding embodiment, wherein the catalyst article is in aged form such that the catalyst article has been aged at a temperature of at least 400° C. for at least 2 hours.

Embodiment 36

A method of measuring surface area of a selective catalytic reduction (SCR) catalyst composition for diesel NO$_x$ abatement, comprising: obtaining a catalyst composition comprising metal-promoted molecular sieves; coating the catalyst composition onto a substrate; calcining and aging the catalyst composition to give a catalyst article; and determining the zeolitic surface area (ZSA) of the calcined and aged catalyst composition in intact form by subjecting the catalyst article in whole/uncrushed form to physisorption analysis and using partial pressure points and gas absorption at each of the partial pressure points to calculate the ZSA.

Embodiment 37

A method of measuring NO$_x$ abatement activity of a selective catalytic reduction (SCR) catalyst composition, comprising: obtaining a catalyst composition comprising metal-promoted molecular sieves; coating the catalyst composition onto a substrate; calcining and aging the catalyst composition; determining the zeolitic surface area (ZSA) of the calcined and aged catalyst composition in intact form; and correlating the ZSA to catalyst NO$_x$ abatement activity to determine whether the catalyst composition is suitable for an intended use.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise. Other aspects and advantages of the present invention will become apparent from the following.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only, and should not be construed as limiting the invention.

DETAILED DESCRIPTION OF THE PREFERRED EMBODIMENTS

Figure 1B:
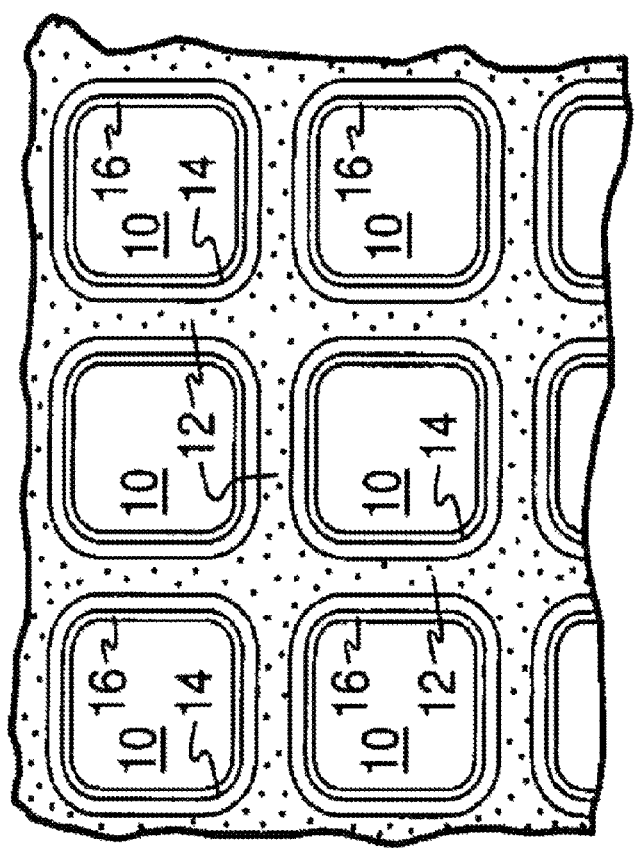
FIG. 1B is a partial cross-sectional view enlarged relative to FIG. 1A and taken along a plane parallel to the end faces of the carrier of FIG. 1A, which shows an enlarged view of a plurality of the gas flow passages shown in FIG. 1A.

The present disclosure will now be described more fully hereinafter with reference to exemplary embodiments thereof. These exemplary embodiments are described so that this disclosure will be thorough and complete, and will fully convey the scope of the disclosure to those skilled in the art. Indeed, the disclosure may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates The present disclosure generally provides catalyst compositions, e.g., SCR catalyst compositions, suitable for at least partial conversion of $NO_x$ emissions from an engine, such as a diesel engine. The catalyst compositions generally comprise one or more metal-promoted molecular sieves (e.g., zeolites), and can be prepared and coated onto a substrate using a washcoat technique as set forth more fully below. The catalyst compositions disclosed herein can provide effective high and/or low temperature performance, depending on the particular physical properties of the catalyst compositions and, in particular, depending on the porosity (and in particular, on the microporosity) of the catalyst composition.

It is generally understood that catalyst compositions exhibit some degree of porosity which, following the IUPAC definition of pore sizes, can be described as being commonly in the form of macroporosity (containing pores with diameters greater than 50 nm) and/or mesoporosity (containing pores with diameters of 2 nm to 50 nm) and/or microporosity (containing pores with diameters of about 2 nm or less). Macroporosity and mesoporosity are known to be important for mass transfer considerations and microporosity affects access to catalyst sites and thus, catalytic activity.

This disclosure describes modifications of the microporosity of a catalyst washcoat composition (as defined by ZSA in $m^2/g$) and, in particular, describes such modifications in the context of obtaining different catalytic activity. Specifically, catalysts exhibiting higher ZSA values are demonstrated herein to have significantly improved low temperature SCR performance. In particular, as will be described in detail herein, the activity of a catalyst composition can be correlated to its ZSA after calcination and aging of the catalyst composition.

Catalyst Composition

The catalyst compositions disclosed herein generally comprise molecular sieves and, in particular, generally comprise metal-promoted (e.g., Cu-promoted or Cu/Fe-promoted) molecular sieves. The phrase "molecular sieve," as used herein refers to framework materials such as zeolites and other framework materials (e.g. isomorphously substituted materials), which may be used, e.g., in particulate form, in combination with one or more promoter metals, as catalysts. Molecular sieves are materials based on an extensive three-dimensional network of oxygen ions containing generally tetrahedral type sites and having a substantially uniform pore distribution, with the average pore size being no larger than 20 Å. The pore sizes are defined by the ring size. As used herein, the term "zeolite" refers to a specific example of a molecular sieve, further including silicon and aluminum atoms. According to one or more embodiments, it will be appreciated that defining the molecular sieves by their structure type is intended to include both molecular sieves having that structure type and any and all isotypic framework materials such as SAPO, AlPO and MeAPO materials having the same structure type.

In more specific embodiments, reference to an aluminosilicate zeolite structure type limits the material to molecular sieves that do not purposely include phosphorus or other metals substituted in the framework. To be clear, as used herein, "aluminosilicate zeolite" excludes aluminophosphate materials such as SAPO, AlPO, and MeAPO materials, and the broader term "zeolite" is intended to include aluminosilicates and aluminophosphates. Zeolites are crystalline materials, understood to be aluminosilicates with open 3-dimensional framework structures composed of corner-sharing $TO_4$ tetrahedra, where T is Al or Si. Zeolites generally comprise silica to alumina (SAR) molar ratios of 2 or greater. Cations that balance the charge of the anionic framework are loosely associated with the framework oxygens, and the remaining pore volume is filled with water molecules. The non-framework cations are generally exchangeable, and the water molecules removable. Zeolites typically have rather uniform pore sizes which, depending upon the type of zeolite and the type and amount of cations included in the zeolite lattice, range from about 3 to 10 Angstroms in diameter.

Molecular sieves can be classified by means of the framework topology by which the structures are identified. Typically, any structure type of zeolite can be used, such as structure types of ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, SCO, CFI, SGF, CGS, CHA, CHI, CLO, CON, CZP, DAC, DDR, DFO, DFT, DOH, DON, EAB, EDI, EMT, EON, EPI, ERI, ESV, ETR, EUO, FAU, FER, FRA, GIS, GIU, GME, GON, GOO, HEU, IFR, IHW, ISV, ITE, ITH, ITW, IWR, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSO, MTF, MTN, MTT, MTW, MWW, NAB, NAT, NES, NON, NPO, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SOD, SOS, SSY, STF, STI, STT, TER, THO, TON, TSC, UEI, UFI, UOZ, USI, UTL, VET, VFI, VNI, VSV, WIE, WEN, YUG, ZON, or combinations thereof. In certain embodiments, the structure type is selected from AEI, AFT, AFV, AFX, AVL, CHA, DDR, EAB, EEI, ERI, IFY, IRN, KFI, LEV, LTA, LTN, MER, MWF, NPT, PAU, RHO, RTE, RTH, SAS, SAT, SAV, SFW, TSC, UFI, and combinations thereof. Existing intergrowth of these materials, e.g., including, but not limited to AEI-CHA are also intended to be encompassed herein.

Zeolites are comprised of secondary building units (SBU) and composite building units (CBU), and appear in many different framework structures. Secondary building units contain up to 16 tetrahedral atoms and are non-chiral. Composite building units are not required to be achiral, and cannot necessarily be used to build the entire framework. For example, a group of zeolites have a single 4-ring (s4r) composite building unit in their framework structure. In the 4-ring, the "4" denotes the positions of tetrahedral silicon and aluminum atoms, and the oxygen atoms are located between tetrahedral atoms. Other composite building units include, for example, a single 6-ring (s6r) unit, a double 4-ring (d4r) unit, and a double 6-ring (d6r) unit. The d4r unit is created by joining two s4r units. The d6r unit is created by joining two s6r units. In a d6r unit, there are twelve tetrahedral atoms. Zeolitic structure types that have a d6r secondary building unit include AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, and WEN. In one or more specific embodiments of the present disclosure, the molecular sieves of the catalyst compositions have the CHA structure type. In particular embodiments, the molecular sieves have the CHA structure type and are selected from the group consisting of SSZ-13, SSZ-62, natural chabazite, zeolite K-G, Linde D, Linde R, LZ-218, LZ-235, LZ-236, ZK-14, SAPO-34, SAPO-44, SAPO-47, and ZYT-6.

As referenced herein above, the disclosed catalyst compositions generally comprise molecular sieves (e.g., zeolites) that are metal-promoted. As used herein, "promoted" refers to a molecular sieve comprising one or more components that are intentionally added, as opposed to comprising impurities that may be inherent in the molecular sieve. Thus, a promoter is a component that is intentionally added to enhance the activity of a catalyst, compared to a catalyst that does not have promoter intentionally added. In order to promote the SCR of oxides of nitrogen, in one or more embodiments according to the present disclosure, a suitable metal is exchanged into the molecular sieves. Copper participates in the conversion of nitrogen oxides and thus may be a particularly useful metal for exchange. Accordingly, in particular embodiments, a catalyst composition is provided which comprises a copper-promoted molecular sieve, e.g., Cu-CHA. However, the invention is not intended to be limited thereto, and catalyst compositions comprising other metal-promoted molecular sieves are also encompassed hereby.

Promoter metals can generally be selected from the group consisting of alkali metals, alkaline earth metals, transition metals in Groups IIIB, IVB, VB, VIB, VIIB, VIIIB, IB, and IIB, Group IIIA elements, Group IVA elements, lanthanides, actinides, and combinations thereof. Certain promoter metals that can, in various embodiments, be used to prepare metal-promoted molecular sieves include, but are not limited to, cobalt (Co), nickel (Ni), lanthanum (La), manganese (Mn), iron (Fe), vanadium (V), silver (Ag), cerium (Ce), neodymium (Nd), praseodymium (Pr), titanium (Ti), chromium (Cr), zinc (Zn), tin (Sn), niobium (Nb), molybdenum (Mo), hafnium (Hf), yttrium (Y), tungsten (W), and combinations thereof. Combinations of such metals can be employed, e.g., copper and iron, giving a mixed Cu—Fe-promoted molecular sieve, e.g., Cu—Fe-CHA.

The promoter metal content of a metal-promoted molecular sieve, calculated as the oxide, is, in one or more embodiments, at least about 0.1 wt. %, based on the total weight of the calcined molecular sieve (including promoter) and reported on a volatile-free basis. In specific embodiments, the promoter metal of the first molecular sieve comprises Cu, and the Cu content, calculated as CuO is in the range of about 0.1 wt. % to about 5 wt. %, including about 0.5 wt. % to about 4 wt. %, about 2 wt. % to about 5 wt. %, or about 1 wt. % to about 3 wt. %, in each case based on the total weight of the calcined molecular sieve reported on a volatile free basis.

The phrase "BET surface area" has its usual meaning of referring to the Brunauer, Emmett, Teller method for determining surface area by $N_2$ adsorption. The BET surface area refers to the overall surface area, i.e., the total of t-plot micropore or zeolitic surface area (ZSA) and external surface area (MSA), such that BET=ZSA+MSA.

The term "ZSA" as used herein is the "zeolitic surface area," and can be expressed in $m^2/g$, $m^2/in^3$, or simply in $m^2$ where objects of equal size by weight or volume are compared. ZSA refers to surface area associated primarily with the micropores of a zeolite (typically about 2 nm or less in diameter). Although "ZSA" refers by name specifically to "zeolite" surface area, this term is intended to be more broadly applicable to molecular sieve surface areas generally. Methods of evaluating ZSA are disclosed throughout the present specification.

As used herein, "tZSA" is the "total zeolitic surface area," and is expressed in $m^2$. The term tZSA also refers to surface area associated primarily with the micropores of a zeolite. The term tZSA can be calculated by multiplying the ZSA by the total weight of the tested core to yield tZSA in, e.g., units of $m^2$. The term tZSA, although referring by name specifically to total "zeolite" surface area, is intended to be more broadly applicable to total molecular sieve surface areas generally.

"Volumetric ZSA" expressed in $m^2/in^3$ of the tested core can be also used when comparing certain catalytic articles, such as coated substrates, e.g., honeycombs, wall-flow filters, and the like. Volumetric ZSA can be obtained by dividing the tZSA by the volume of the tested core to yield volumetric ZSA in, e.g., units of $m^2/in^3$.

The term "MSA" as used herein is the "matrix surface area" and can be also expressed in $m^2/g$, $m^2/in^3$, or in $m^2$, as defined above. The term MSA refers to surface area associated specifically with the matrix (typically greater than about 2 nm in diameter).

Substrate

According to one or more embodiments, the substrate (onto which the molecular sieve-containing catalyst composition is applied to give a catalytic article, e.g., an SCR catalytic article) may be constructed of any material typically used for preparing automotive catalysts and will typically comprise a metal or ceramic honeycomb structure. As used herein, the term "substrate" refers to a monolithic material onto which the catalyst composition is applied, typically in the form of a washcoat. The substrate typically provides a plurality of wall surfaces upon which a SCR washcoat composition (e.g., comprising the metal-promoted molecular sieve disclosed herein above) is applied and adhered, thereby acting as a carrier for the catalyst composition.

Exemplary metallic substrates include heat resistant metals and metal alloys, such as titanium and stainless steel as well as other alloys in which iron is a substantial or major component. Such alloys may contain one or more of nickel, chromium, and/or aluminum, and the total amount of these metals may advantageously comprise at least 15 wt. % of the alloy, e.g., 10-25 wt. % of chromium, 3-8 wt. % of aluminum, and up to 20 wt. % of nickel. The alloys may also contain small or trace amounts of one or more other metals, such as manganese, copper, vanadium, titanium and the like. The surface or the metal carriers may be oxidized at high temperatures, e.g., 1000° C. and higher, to form an oxide layer on the surface of the substrate, improving the corrosion resistance of the alloy and facilitating adhesion of the washcoat layer to the metal surface. Ceramic materials used to construct the substrate may include any suitable refractory material, e.g., cordierite, mullite, cordierite-α alumina, silicon nitride, zircon mullite, spodumene, aluminasilica magnesia, zircon silicate, sillimanite, magnesium silicates, zircon, petalite, a alumina, aluminosilicates and the like.

Any suitable substrate may be employed, such as a monolithic flow-through substrate having a plurality of fine, parallel gas flow passages extending from an inlet to an outlet face of the substrate such that passages are open to fluid flow. The passages, which are essentially straight paths from the inlet to the outlet, are defined by walls on which the catalytic material is coated as a washcoat so that the gases flowing through the passages contact the catalytic material. The flow passages of the monolithic substrate are thinwalled channels which can be of any suitable cross-sectional shape, such as trapezoidal, rectangular, square, sinusoidal, hexagonal, oval, circular, and the like. Such structures may contain from about 60 to about 1200 or more gas inlet openings (i.e., "cells") per square inch of cross section (cpsi), more usually from about 300 to 600 cpsi. The wall thickness of flow-through substrates can vary, with a typical range being between 0.002 and 0.1 inches. A representative commercially-available flow-through substrate is a cordierite substrate having 400 cpsi and a wall thickness of 6 mil, or 600 cpsi and a wall thickness of 4 mil. However, it will be understood that the invention is not limited to a particular substrate type, material, or geometry.

In alternative embodiments, the substrate may be a wall-flow filter substrate, wherein each passage is blocked at one end of the substrate body with a non-porous plug, with alternate passages blocked at opposite end-faces. This requires that gas flow through the porous walls of the wall-flow substrate to reach the exit. Such monolithic substrates may contain up to about 700 or more cpsi, such as about 100 to 400 cpsi and more typically about 200 to about 300 cpsi. The cross-sectional shape of the cells can vary as described above. Wall-flow substrates typically have a wall thickness between 0.002 and 0.1 inches. A representative commercially available wall-flow substrate is constructed from a porous cordierite, an example of which has 200 cpsi and 10 mil wall thickness or 300 cpsi with 8 mil wall thickness, and wall porosity between 45-65%. Other ceramic materials such as aluminum-titanate, silicon carbide and silicon nitride are also used as wall-flow filter substrates. However, it will be understood that the invention is not limited to a particular substrate type, material, or geometry. Note that where the substrate is a wall-flow substrate, the catalyst composition associated therewith can permeate into the pore structure of the porous walls (i.e., partially or fully occluding the pore openings) in addition to being disposed on the surface of the walls.

Figure 1A:
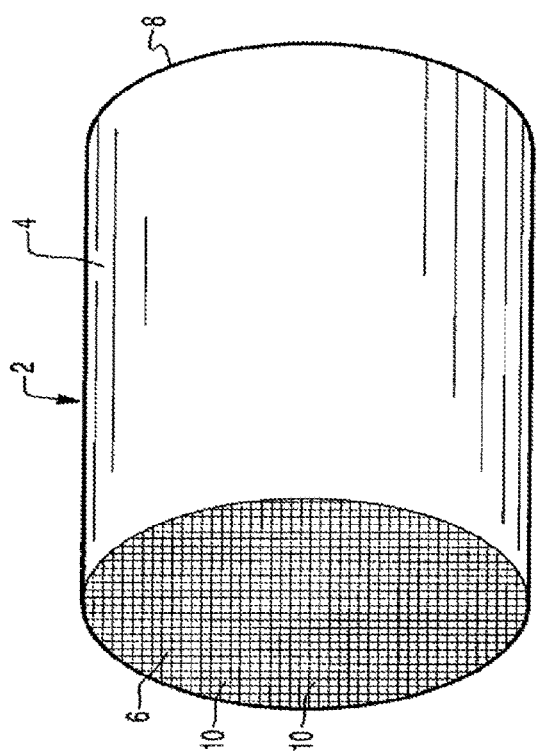
FIG. 1A is a perspective view of a honeycomb-type substrate which may comprise a washcoat composition in accordance with the present invention.

FIGS. 1A and 1B illustrate an exemplary substrate 2 in the form of a flow-through substrate coated with a washcoat composition as described herein. Referring to FIG. 1A, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 1B, flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 1B, walls 12 are so dimensioned and configured that gas flow passages 10 have a substantially regular polygonal shape. As shown, the washcoat composition can be applied in multiple, distinct layers if desired. In the illustrated embodiment, the washcoat consists of both a discrete bottom washcoat layer 14 adhered to the walls 12 of the carrier member and a second discrete top washcoat layer 16 coated over the bottom washcoat layer 14. The present invention can be practiced with one or more (e.g., 2, 3, or 4) washcoat layers and is not limited to the two-layer embodiment illustrated in FIG. 1B.

In describing the quantity of washcoat or catalytic metal components or other components of the composition, it is convenient to use units of weight of component per unit volume of catalyst substrate. Therefore, the units, grams per cubic inch ("g/in$^3$") and grams per cubic foot ("g/ft$^3$"), are used herein to mean the weight of a component per volume of the substrate, including the volume of void spaces of the substrate. Other units of weight per volume such as g/L are also sometimes used. The total loading of the SCR catalyst composition (including the metal-promoted molecular sieve material) on the catalyst substrate, such as a monolithic flow-through substrate, is typically from about 0.5 to about 6 g/in$^3$, and more typically from about 1 to about 5 g/in$^3$. It is noted that these weights per unit volume are typically calculated by weighing the catalyst substrate before and after treatment with the catalyst washcoat composition, and since the treatment process involves drying and calcining the catalyst substrate at high temperature, these weights represent an essentially solvent-free catalyst coating as essentially all of the water of the washcoat slurry has been removed.

Method of Making a SCR Composition

According to the present disclosure, a SCR catalyst composition is generally prepared by providing a metal-promoted molecular sieve material. A molecular sieve having the CHA structure may be prepared according to various techniques known in the art, for example U.S. Pat. No. 4,544,538 to Zones and U.S. Pat. No. 6,709,644 to Zones, and International Patent Application Publication No. WO 2011/064186 to Bull, which are herein incorporated by reference in their entireties.

To prepare metal-promoted molecular sieves according to various embodiments of the invention, a metal (e.g., copper) is ion exchanged into the molecular sieves. Such metals are generally ion exchanged into alkali metal or NH$_4$ molecular sieves (which can be prepared by NH$_4$ ion exchange into an alkali metal molecular sieve by methods known in the art, e.g., as disclosed in Bleken, F. et al. Topics in Catalysis 2009, 52, 218-228, which is incorporated herein by reference).

Preparation of the metal ion-promoted molecular sieves typically comprises an ion-exchange process of the molecular sieves in particulate form with a metal precursor solution. For example, a copper salt can be used to provide copper. When copper acetate is used to provide copper, the copper concentration of the liquid copper solution used in the copper ion-exchange is in specific embodiments in the range from about 0.01 to about 0.4 molar, more specifically in the range from about 0.05 to about 0.3 molar, even more specifically in the range from about 0.1 to about 0.25 molar, even more specifically in the range from about 0.125 to about 0.25 molar, even more specifically in the range from about 0.15 to about 0.225 molar and even more specifically in the range from about 0.2. In specific embodiments, a metal, such as copper, is ion exchanged into alkali metal or NH$_4$-Chabazite to form Cu-Chabazite.

For additional promotion of SCR of oxides of nitrogen, in some embodiments, the molecular sieves can be promoted with two or more metals (e.g., copper in combination with one or more other metals). Where two or more metals are to be included in a metal ion-promoted molecular sieve material, multiple metal precursors (e.g., copper and iron precursors) can be ion-exchanged at the same time or separately. In certain embodiments, the second metal can be exchanged into a molecular sieve material that has first been promoted with the first metal (e.g., a second metal can be exchanged into a copper-promoted molecular sieve material). The second molecular sieve material can vary and, in some embodiments, may be iron or an alkaline earth or alkali metal. Suitable alkaline earth or alkali metals include, but are not limited to, barium, magnesium, beryllium, calcium, strontium, radium, and combinations thereof.

Substrate Coating Process

As referenced above, the SCR composition is prepared and coated on a substrate. This method can comprise mixing a catalyst composition as generally disclosed herein with a solvent (e.g., water) to form a slurry for purposes of coating a catalyst substrate. In addition to the catalyst composition (i.e., the metal-promoted molecular sieves), the slurry may optionally contain various additional components. Typical additional components include, but are not limited to, one or more binders and additives to control, e.g., pH and viscosity of the slurry. Particular additional components can include alumina as a binder, hydrocarbon (HC) storage components (e.g., zeolite), associative thickeners, and/or surfactants (including anionic, cationic, non-ionic or amphoteric surfactants) and zirconium acetate.

Optionally, although not common in diesel systems, as noted above, the slurry may contain one or more hydrocarbon (HC) storage component for the adsorption of hydrocarbons (HC). Any known hydrocarbon storage material can be used, e.g., a microporous material such as a zeolite or zeolite-like material. When present, zeolite or other HC storage components are typically used in an amount of about 0.05 g/in$^3$ to about 1 g/in$^3$. When present, an alumina binder is typically used in an amount of about 0.02 g/in$^3$ to about 0.5 g/in$^3$. The alumina binder can be, for example, boehmite, gamma-alumina, or delta/theta alumina.

The slurry can, in some embodiments be milled to enhance mixing of the particles and formation of a homogenous material. The milling can be accomplished in a ball mill, continuous mill, or other similar equipment, and the solids content of the slurry may be, e.g., about 20-60 wt. %, more particularly about 30-40 wt. %. In one embodiment, the post-milling slurry is characterized by a D90 particle size of about 5 to about 50 microns (e.g., about 5 to about 20 microns or about 10 to about 20 microns). The D90 is defined as the particle size at which about 90% of the particles have a finer particle size.

The slurry is generally coated on the catalyst substrate using a washcoat technique known in the art. As used herein, the term "washcoat" has its usual meaning in the art of a thin, adherent coating of a material (e.g., a catalytic material) applied to a substrate, such as a honeycomb flow-through monolith substrate or a filter substrate which is sufficiently porous to permit the passage therethrough of the gas stream being treated. As used herein and as described in Heck, Ronald and Robert Farrauto, Catalytic Air Pollution Control, New York: Wiley-Interscience, 2002, pp. 18-19, a washcoat layer includes a compositionally distinct layer of material disposed on the surface of a monolithic substrate or an underlying washcoat layer. A substrate can contain one or more washcoat layers, and each washcoat layer can have unique chemical catalytic functions.

A washcoat is generally formed by preparing a slurry containing a specified solids content (e.g., 30-90% by weight) of catalyst material (here, the metal-promoted molecular sieves) in a liquid vehicle, which is then coated onto the substrate (or substrates) and dried to provide a washcoat layer. To coat the wall flow substrates with the catalyst material of one or more embodiments, the substrates can be immersed vertically in a portion of the catalyst slurry such that the top of the substrate is located just above the surface of the slurry. In this manner, slurry contacts the inlet face of each honeycomb wall, but is prevented from contacting the outlet face of each wall. The sample is left in the slurry for about 30 seconds. The substrate is removed from the slurry, and excess slurry is removed from the wall flow substrate first by allowing it to drain from the channels, then by blowing with compressed air (against the direction of slurry penetration), and then by pulling a vacuum from the direction of slurry penetration. By using this technique, the catalyst slurry permeates the walls of the substrate, yet the pores are not occluded to the extent that undue back pressure will build up in the finished substrate. As used herein, the term "permeate" when used to describe the dispersion of the catalyst slurry on the substrate, means that the catalyst composition is dispersed throughout the wall of the substrate.

Thereafter, the coated substrate is dried at an elevated temperature (e.g., 100-150° C.) for a period of time (e.g., 1-3 hours) and then calcined by heating, e.g., at 400-600° C., typically for about 10 minutes to about 3 hours. Following drying and calcining, the final washcoat coating layer can be viewed as essentially solvent-free.

After calcining, the catalyst loading can be determined through calculation of the difference in coated and uncoated weights of the substrate. As will be apparent to those of skill in the art, the catalyst loading can be modified by altering the slurry rheology. In addition, the coating/drying/calcining process can be repeated as needed to build the coating to the desired loading level or thickness.

Aging can be conducted under various conditions and, as used herein, "aging" is understood to encompass a range of conditions (e.g., temperature, time, atmosphere). Exemplary aging protocols involve subjecting the calcined coated substrate to a temperature of 750° C. for about 5 hours in 10% steam or to a temperature of 800° C. for about 16 hours in 10% steam. However, these protocols are not intended to be limiting and the temperature can be lower or higher (e.g., including but not limited to, temperatures of 400° C. and higher, e.g., 400° C. to 1000° C., 600° C. to 950° C., or 650° C. to 800° C.); the time may be lesser or greater (e.g., including but not limited to, times of about 1 hour to about 100 hours or about 2 hours to about 50 hours); and the atmosphere can be modified (e.g., to have different amounts of steam and/or other constituents present therein).

Of particular importance herein, the resulting coated substrate is evaluated (after calcination and aging) to determine the surface area of the final catalyst material. The activity of the catalyst can be affected by the zeolitic surface area (ZSA) of the washcoat, particularly after calcination and aging. ZSA, typically provided in units of m$^2$/g, m$^2$/in$^3$, or m$^2$, provides a measure of the micropore surface area (pores≤2 nm in diameter).

Traditionally, BET/ZSA measurements are made by preparing a catalyst composition, coating the composition onto a substrate core (a portion of a substrate as disclosed herein above), calcining and aging the coated core, and scraping off and/or crushing the coating (washcoat) to obtain measurements on the coating (washcoat). This method is time consuming and tedious and leads to results that may not be accurate due to the difficulty of obtaining a sample that is a true representation of the active, tested washcoat. In a typical method, a washcoat powder as referenced above is placed in a narrow neck tube with a cylindrical bulb on the bottom. The sample is then degassed at 200-500° C. for up to about 6 hours under a flow of dry nitrogen or in vacuum. After cooling, the sample tube is weighed and then placed on the instrument for BET measurement. Typically, the adsorption gas is nitrogen but other gases (e.g., including, but not limited to, argon and carbon dioxide and mixtures thereof) can also be used. When the measurement is complete, the instrument software calculates the BET Surface Area, Matrix Surface Area (MSA) and the t-plot micropore (Zeolitic) Surface Area (ZSA).

According to the present disclosure, a new method has been developed to measure the BET/ZSA of full, intact cores (i.e., without removing the coating (washcoat) from the core, and/or without crushing the core prior to BET/ZSA testing). The cores can be of varying sizes and can advantageously be evaluated in whole/uncrushed form (e.g., in the actual physical form as tested for SCR performance). Whole/uncrushed form as used herein is intended to mean that at least one cell of the core is structurally intact.

Specifically, a coated core is placed in a sample tube, weighed, and introduced into a nitrogen physisorption analyzer. The sample is analyzed using at least 3 nitrogen partial pressure points between 0.08 and 0.21 $P/P_0$. BET surface area can be obtained from the resulting isotherm. Further details regarding an exemplary setup for this testing is provided below in Example 3. The BET surface area is a combination of ZSA and matrix surface area (MSA) (pores>2 nm) (BET=ZSA+MSA). Accordingly, ZSA (and MSA) values can be obtained by calculation using software associated with the instrument. Using the partial pressure points and the volume of nitrogen adsorbed at each partial pressure, these values are then used in the Harkins and Jura equation and plotted as Volume Adsorbed vs. Thickness: Harkins and Jura Equation 1 (Harkins and Jura Equation):

$$\text{Thickness} = (13.99/0.034 - \log_{10}(P/P_0))^{1/2}$$

A least-squares analysis fit is performed on the nitrogen adsorbed volume vs. thickness plot. From this, the slope and the Y-intercept are calculated. Matrix (external) surface area (MSA) and then zeolitic surface area (ZSA) are calculated based on Equations 2 and 3.

$$MSA = (\text{Slope} \times 0.0015468/1.0) \quad \text{Equation 2:}$$

$$ZSA = BET - MSA \quad \text{Equation 3:}$$

It should be pointed out that those skilled in the art of evaluating BET will be aware that the BET/ZSA can also be evaluated using nitrogen (or other adsorbing gas) partial pressure points outside of the 0.08 to 0.21 $P/P_0$ range. While BET/ZSA results may vary from those obtained using $P/P_0$ in the 0.08-0.21 range, they can be used to evaluate and compare samples.

In some embodiments, higher ZSA can improve low temperature SCR performance. Accordingly, given this determined correlation between ZSA of calcined, aged catalytic material and $NO_x$ conversion at particular temperatures, one can target a particular ZSA for a particular application (specifically, targeting a higher ZSA where low temperature performance is especially important).

The methods of the present disclosure provide for catalyst compositions and catalysts comprising such compositions with defined microporosities. In particular, catalyst articles comprising an SCR composition of the present disclosure with a ZSA of about 100 m²/g or greater are provided. In some embodiments, the catalyst article has a ZSA of about 120 m²/g or 125 m²/g or greater or about 130 m²/g or greater. In other embodiments, the catalyst article has a ZSA of about 100 m²/g to about 600 m²/g, about 125 m²/g to about 600 m²/g, about 150 m²/g to about 600 m²/g, about 175 m²/g to about 600 m²/g, about 200 m²/g to about 600 m²/g, about 225 m²/g to about 600 m²/g, about 250 m²/g to about 600 m²/g, about 300 m²/g to about 600 m²/g, about 350 m²/g to about 600 m²/g, about 400 m²/g to about 600 m²/g, about 450 m²/g to about 600 m²/g, or about 500 m²/g to about 600 m²/g. In some other embodiments, the catalyst article has a ZSA of about 120 m²/g to about 550 m²/g, about 130 m²/g to about 500 m²/g, about 140 m²/g to about 450 m²/g, about 150 m²/g to about 400 m²/g, about 160 m²/g to about 350 m²/g, about 170 m²/g to about 300 m²/g, about 180 m²/g to about 300 m²/g, about 190 m²/g to about 275 m²/g, or about 200 m²/g to about 250 m²/g. Exemplary ranges for certain embodiments include, but are not limited to, about 120 m²/g to about 250 m²/g or about 120 m²/g to about 200 m²/g. Exemplary ranges for certain embodiments include, but are not limited to, about 120 m²/g to about 250 m²/g or about 120 m²/g to about 200 m²/g. Catalyst articles with such ZSA values advantageously, in various embodiments, exhibit enhanced $NO_x$ conversion activity at low temperatures (e.g., around 200° C.). The values in this paragraph are expressed in grams of aged tested core, as disclosed herein above.

In certain embodiments, aged tested cores are defined in terms of their "total ZSA," or "tZSA." To obtain tZSA values, the previously described core ZSA (typically reported in m²/g) is multiplied by the total weight of the tested core to yield tZSA in m². Typical size of the tested core considered for the purpose of these embodiments is approximately 1.3 in³ (as provided in Example 2); however, use of "tZSA" accounts for cores of varying sizes (e.g., weights). According to the present disclosure, tZSA values are advantageously maximized (particularly to provide low temperature SCR performance). Exemplary tZSA values are about 1000 m² or greater, about 1200 m² or greater, about 1300 m² or greater, about 1500 m² or greater, about 2000 m² or greater, about 2100 m² or greater, or about 2200 m² or greater. In some embodiments, the tZSA values include about 1000 to about 6600 m², about 1150 to about 6500 m², about 1200 to about 6400 m², or about 1250 to about 6300 m², or about 1300 to about 6200 m², or about 1350 to about 6100 m², or about 1400 to about 6000 m², or about 1450 to about 5900 m², or about 1500 to about 5800 m², or about 1550 to about 5700 m², or about 1600 to about 5600 m², or about 1650 to about 5500 m², or about 1700 to about 5400 m², or about 1750 to about 5300 m², or about 1800 to about 5200 m², or about 1850 to about 5100 m², or about 1900 to about 5000 m², or about 1950 to about 4900 m², or about 2000 to about 4800 m², or about 2050 to about 4700 m², or about 2150 to about 4600 m², or about 2200 to about 4500 m², or about 2250 to about 4400 m², or about 2300 to about 4300 m², or about 2350 to about 4200 m², or about 2400 to about 4100 m², or about 2450 to about 4000 m², or about 2500 to about 3900 m², or about 2550 to about 3600 m², or about 2600 to about 3500 m², or about 2650 to about 3400 m², or about 2700 to about 3300 m², or about 2750 to about 3200 m², or about 2800 to about 3100 m². In some embodiments, the tZSA values include, but are not limited to, about 1000 to about 3000 m², about 1200 to about 3000 m², about 1500 to about 3000 m², or about 2000 to about 3000 m².

In yet other embodiments, aged tested cores are described in terms of "Volumetric ZSA." To obtain volumetric ZSA values, the previously described t ZSA (reported in m²) is divided by the total volume of the tested core to yield volumetric ZSA in m²/in³. Typical size of the tested core considered for the purpose of these embodiments is approximately 1.3 in³ (as provided in Example 2); however, use of "volumetric ZSA" accounts for cores of varying sizes (e.g., volumes). According to the present disclosure, volumetric ZSA values are advantageously maximized (particularly to provide low temperature SCR performance). Exemplary volumetric ZSA values are about 900 m²/in³ or greater, about 1000 m²/in³ or greater, about 1100 m²/in³ or greater, about 1200 m²/in³ or greater, about 1500 m²/in³ or greater, or about 1600 m²/in³ or greater. In some embodiments, the volumetric ZSA values include about 900 to about 5100 m²/in³, about 950 to about 5000 m²/in³, about 1000 to about 4900 m²/in³, about 1050 to about 4800 m²/in³, about 1100 to about 4700 m²/in³, about 1150 to about 4600 m²/in³, about 1200 to about 4500 m²/in³, about 1250 to about 4400 m²/in³, about 1300 to about 4300 m²/in³, about 1350 to about 4200 m²/in³, about 1400 to about 4100 m²/in³, about 1450 to about 4000 m²/in³, about 1500 to about 3900 m²/in³, about 1550 to about 3800 m²/in³, about 1600 to about 3700 m²/in³, about 1650 to about 3600 m²/in³, about 1700 to about 3500 m²/in³, about 1750 to about 3400 m²/in³, about 1800 to about 3300 m²/in³, about 1850 to about 3200 m²/in³, about 1900 to about 3100 m²/in³, about 1950 to about 3000 m²/in³, about 2000 to about 2900 m²/in³, about 2050 to about 2800 m²/in³, about 2100 to about 2700 m²/in³, about 2150 to about 2600 m²/in³, about 2200 to about 2500 m²/in³, or about 2250 to about 2400 m²/in³. In some embodiments, the volumetric ZSA values include, but are not limited to, about 900 to about 2300 m²/in³, about 1000 to about 2300 m²/in³, about 1100 to about 2300 m²/in³, about 1200 to about 2300 m²/in³, or about 1500 to about 2300 m²/in³.

Emission Treatment System

Selective reduction of nitrogen oxides utilizing catalyst compositions according to the present disclosure is generally carried out in the presence of ammonia or urea. In particular, an SCR system including a catalyst composition prepared according to the methods described herein (i.e., targeting a low or high ZSA, depending upon whether high or low temperature activity is particularly desired) can be integrated in the exhaust gas treatment system of a vehicle. An exemplary SCR system can include the following components: an SCR catalyst composition as described herein; a urea storage tank; a urea pump; a urea dosing system; a urea injector/nozzle; and a respective control unit.

In some aspects, the present disclosure also can relate to a method for selectively reducing nitrogen oxides ($NO_x$) from a stream, such as an exhaust gas. In particular, the stream can be contacted with a catalyst composition prepared according to the present disclosure. The term nitrogen oxides, or $NO_x$, as used herein encompasses any and all oxides of nitrogen, including but not limited to $N_2O$, NO, $N_2O_3$, $NO_2$, $N_2O_4$, $N_2O_5$, and $NO_3$.

In some embodiments, a catalyst composition as described herein can be effective to provide a $NO_x$ conversion of at least 60%, at least 65%, at least 70%, at least 75%, at least 80%, or at least 85% over a temperature range of about 200° C. to about 600° C., about 250° C. to about 600° C., about 300° C. to about 600° C., about 300° C. to about 550° C., about 300 to about 500° C., or about 350° C. to about 450° C. In particular embodiments, a catalyst composition can be provided to provide a $NO_x$ conversion of at least about 70% at 200° C. (e.g., wherein the catalyst composition has a ZSA of greater than about 120 m²/g or tZSA of greater than about 1300 m² for an ~1.3 in³ core, in calcined fresh and/or aged form).

The present invention also provides an emission treatment system that incorporates the SCR composition or article described herein. The SCR composition of the present invention is typically used in an integrated emissions treatment system comprising one or more additional components for the treatment of diesel exhaust gas emissions. As such, the terms "exhaust stream", "engine exhaust stream", "exhaust gas stream" and the like refer to the engine effluent as well as to the effluent downstream of one or more other catalyst system components as described herein.

EXPERIMENTAL

Aspects of the present invention are more fully illustrated by the following examples, which are set forth to illustrate certain aspects of the present invention and are not to be construed as limiting thereof.

Example 1—General Preparation of Molecular Sieve Powders and Powder Catalytic Compositions A molecular sieve powder with the chabazite framework structure (CHA) was prepared by crystallization of chabazite using ADAOH (trimethyl-1-adamantylammonium hydroxide) containing synthesis gel, separation of the chabazite product, drying and calcination to remove organic template (ADAOH). Water, ADAOH solution, and aqueous sodium hydroxide were added into the make-down tank and mixed for several minutes. Aluminum isopropoxide powder was then added in 3-5 minutes. Colloidal silica was then added with stirring in 5 minutes. Mixing was continued for an additional 30 minutes, resulting in a viscous gel of uniform composition. The gel was then transferred to the autoclave. The autoclave was heated to 170° C., and crystallization was continued for 10-30 hours while maintaining agitation. The reactor was cooled to ambient temperature and vented to atmospheric pressure prior to unloading. After hydrothermal crystallization, the resultant suspension had a pH of 11.5. The suspension was admixed with deionized water and was filtered using a Buchner funnel. The wet product was then heated to a temperature of 120° C. in air for 4 hrs. The dried product was then further calcined in air at 600° C. for 5 hrs. to remove the template and ensure a carbon content of less than 0.1 wt. %.

The CHA was then ion exchanged with copper according to the following procedure. A 10 g sample of CHA was placed on a moisture balance to obtain a moisture value/loss on drying (LOD) value. A 250 mL glass beaker with stir bar was placed on a hot plate with thermocouple probe. The liquids to solids ratio was 5:1 and to achieve this value, the amount of Cu-acetate needed to achieve a desired molar concentration of Cu-Acetate (typically 0.1-0.3 M) was calculated, the moisture in the CHA powder was subtracted from 50 g deionized water, and the resultant amount of deionized water was added to the beaker. The beaker was covered with a watch glass and the mixture was heated to 60° C. Upon reaching this temperature, the amount of zeolite (based on the moisture content) was added to the beaker. The Cu-acetate was then immediately added. The beaker was again covered with the watch glass and the mixture was held for one hour at 60° C. After this time, the heat was removed and the resulting slurry was cooled for about 20-30 minutes.

The slurry was then removed from the beaker and passed through a Buchner funnel and the filtered solids were washed with additional deionized water. The filtered, washed solids (Cu-CHA) were dried at 85° C. overnight.

Example 2—Preparation of Cu-CHA-Containing Catalysts

Water (162.0 g) was added to dry Cu-CHA zeolite powder (108.2 g), giving a 40% solids slurry. Zirconium acetate (17.8 g of a 30.3 wt. % zirconium acetate solution in water, equivalent to 5.41 g of zirconium acetate, calculated as about 5 wt. % based on the zeolite content) was added. The mixture was shear mixed at 2500 rpm for 30 minutes and 1-2 drops of octanol was added to defoam the resulting slurry. The slurry solids content was determined to be 39.90% by weight, the pH of the slurry was 4.05, the D90 particle size of the slurry was 6.7 μm, and the viscosity of the slurry was 60 cps. Two square cores (13 cells×13 cells×3.00 in) with 400/6 cell density were coated with the slurry to give about a 2.1 g/in$^3$ loading (+/−0.1 g/in$^3$, i.e., within the range of 2.0-2.20 g/in$^3$) by dip coating, drying at 130° C. for 4 minutes, coating again if necessary, and calcining after the target loading was reached. The calcination protocol used involved the steps of: heating for 15 minutes to achieve a temperature of 130° C.; holding the temperature for 240 minutes at 130° C.; heating for 100 minutes to achieve a temperature of 450° C.; holding the temperature at 450° C. for 60 minutes; cooling for 120 minutes to lower the temperature to 130° C.; and holding the temperature at 130° C. until the calcined cores were removed and weighed. The mass loss after calcining was about 0.05 to about 0.1 g. The calcined cores were then aged at 750° C. for 5 hr. in 10% steam. Typical approximate volume of the above coated cores is 1.3 in$^3$.

Example 3—SCR Evaluation of Cu-CHA-Containing Catalyst with Various Microporosities Fresh and/or aged cores were then tested for SCR performance in a tube reactor using a standard protocol, e.g., as disclosed in PCT Application Publication No. WO2008/106519 to Bull et al., which is incorporated herein by reference.

The tested cores were also analyzed to determine BET/ZSA of the material immediately after SCR testing (such that this surface area analysis can be correlated with SCR performance). One large clean and dry glass tube (ID~1") was pre-weighed and a core (which has just been tested for SCR performance) was added to the tube and the initial weight of the core was determined. The core-containing tube was placed in a degassing unit and degassed at 400° C. for approximately 4 hours under a flow of dry nitrogen. The core was then allowed to cool, and the core-containing tube was reweighed to obtain the final weight of the core. The core-containing tube was introduced into an automated nitrogen physisorption analyzer (Micromeritics TriStar series 3020). Other physisorption analyzers that can be used include Micromeritics TriStar II series 3030 and Micromeritics ASAP 2460 (as well as instruments from other manufacturers).

A displacement tube was placed within the glass tube to fill extra volume not displaced by the core, and the glass tube was sealed and enclosed within an isothermal jacket to maintain the tube at constant liquid nitrogen (LN$_2$) temperature. The sample was analyzed using 3 or more partial pressure points between 0.08 and 0.21. BET surface area was obtained from the resulting isotherm; ZSA and MSA were calculated based on these results using methods and calculations described herein above.

A series of CHA catalysts were prepared, formulated into wash-coats and coated onto cores, which were calcined and aged as described above. The nominal CuO loading for each was 3.25% by weight. SCR results (NO$_x$ conversion) are shown in Table 1, below. Table 1 also provides the results of ZSA analysis of the aged tested cores.

TABLE 1

ZSA Values

| Sample # | Nominal CuO loading (% by weight) | NO$_x$ Conversion at 200° C. (%) | Core ZSA (m$^2$/g) | Nominal washcoat loading (g/in$^3$) |
| --- | --- | --- | --- | --- |
| 1 | 3.25 | 58 | 89 | 2.1 |
| 2 | 3.25 | 65 | 99 | 2.1 |
| 3 | 3.25 | 67 | 105 | 2.1 |
| 4 | 3.25 | 70 | 125 | 2.1 |
| 5 | 3.25 | 79 | 137 | 2.1 |
| 6 | 3.25 | 81 | 144 | 2.1 |

The data of Table 1 demonstrates that the catalyst compositions with reasonably high ZSA values (e.g., Samples 4-6) had significantly better NO$_x$ conversion at 200° C.

Example 4—Preparation, SCR Evaluation, and ZSA Analysis of Cu-CHA-Containing Catalysts with Varying Microporosities and Substrates Following the procedure described in Example 2, a series of coated catalysts was prepared using 400 and 600 cpsi substrates with wall thicknesses of 3 to 6 mils and washcoat loadings of 2.1-3.4 g/in$^3$ (see Table 2).

TABLE 2

NO$_x$ conversion as a function of coated tested core ZSA

| Sample # | Nominal CuO loading (% by weight) | NO$_x$ Conversion 200° C. (%) | Substrate | Core ZSA (m$^2$/g) | Nominal washcoat loading (g/in$^3$) |
| --- | --- | --- | --- | --- | --- |
| 1 | 3.7 | 66 | 400/6 | 94 | 2.1 |
| 2 | 3.7 | 71 | 400/6 | 127 | 2.5 |
| 3 | 3 | 83 | 400/6 | 126 | 3 |
| 4 | 3 | 88 | 600/3 | 187 | 3 |
| 5 | 3 | 90 | 600/4.5 | 219 | 3 |
| 6 | 3.7 | 81 | 400/6 | 140 | 3.4 |

This data demonstrates that, even with varying CuO content, substrate cell density, wall thickness, and washcoat loading, the core ZSA is the key factor affecting low temperature NOx conversion. Thus, it is highly preferred and beneficial to achieve maximum possible core ZSA of the finished coated catalyst for optimal NOx conversion.

Figure 2:
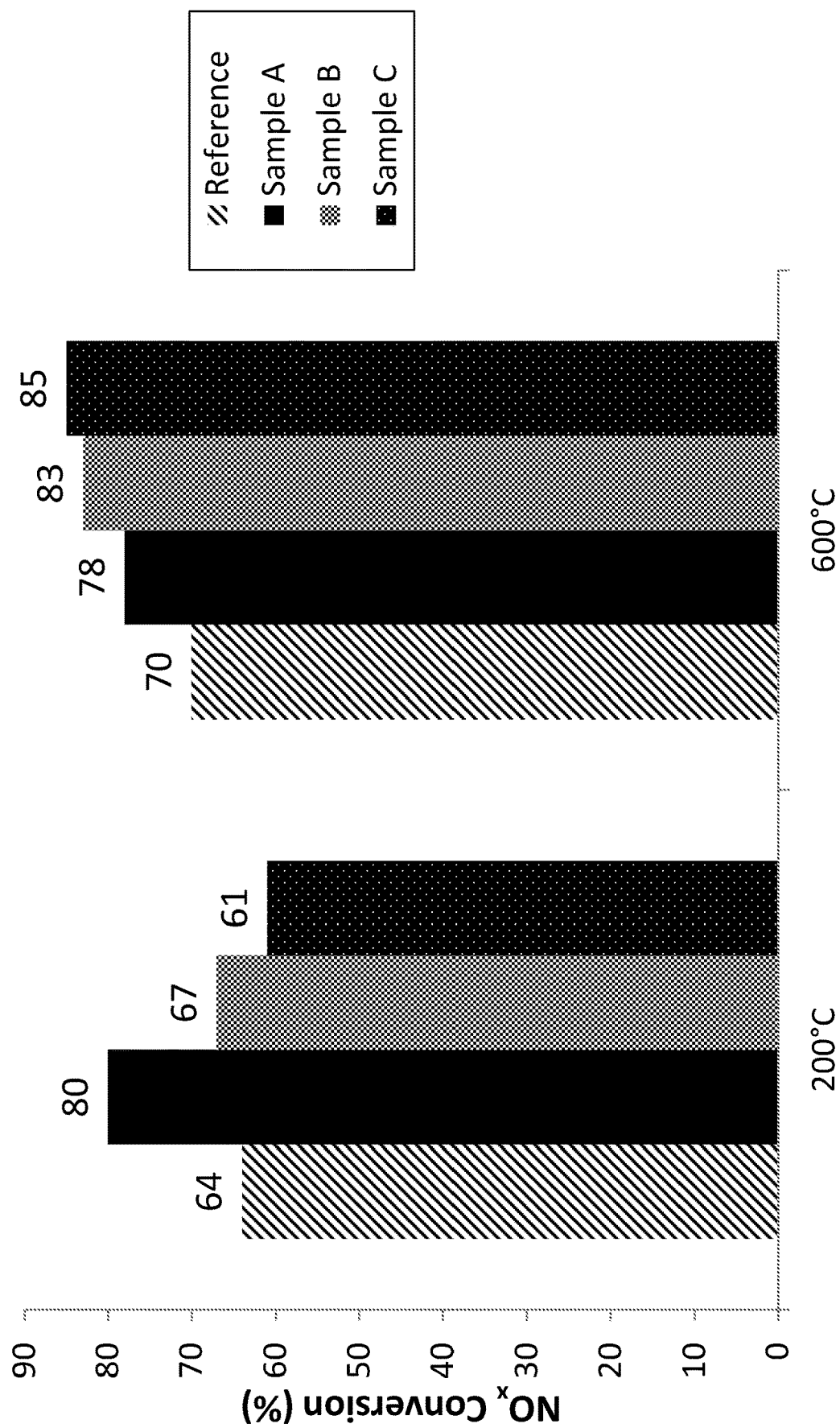
FIG. 2 is a graph demonstrating $NO_x$ conversion for various catalyst compositions at low (200° C.) and high (600° C.) temperatures.

Example 5—Further ZSA and SCR Performance Evaluation of Cu-CHA-Containing Catalyst with Various Microporosities The SCR performance of calcined, aged coated cores comprising various Cu-CHA catalyst compositions were compared as shown in FIG. 2. In this figure: "Reference" is a core coated with a comparative Cu-CHA catalyst composition comprising 3% CuO; Samples A, B and C were coated with comparative Cu-CHA catalysts with nominal CuO content of 3.2% and washcoat loading of about 2.1 g/in³. Coatings were performed using slurries with 20-40% solids. All samples are considered to have similar powder ZSA and similar copper loading.

After SCR testing (with data presented in FIG. 2), the full size coated samples were evaluated for BET surface area/ZSA using the large volume sample holder and calculations described herein above. Notably, ZSA was calculated based on BET measurement using both the Harkins and Jura equation and the deBoer equation and the results were comparable, as shown below in Table 3.

TABLE 3

Comparison of ZSA calculations based on measured BET

| Sample | Measured BET (m²/g) | ZSA calculation (m²/g) | |
|---|---|---|---|
| | | Harkins and Jura Equation | deBoer Equation |
| A | 170 | 159 | 158 |
| B | 113 | 105 | 105 |
| C | 87 | 78 | 78 |

Figure 3:
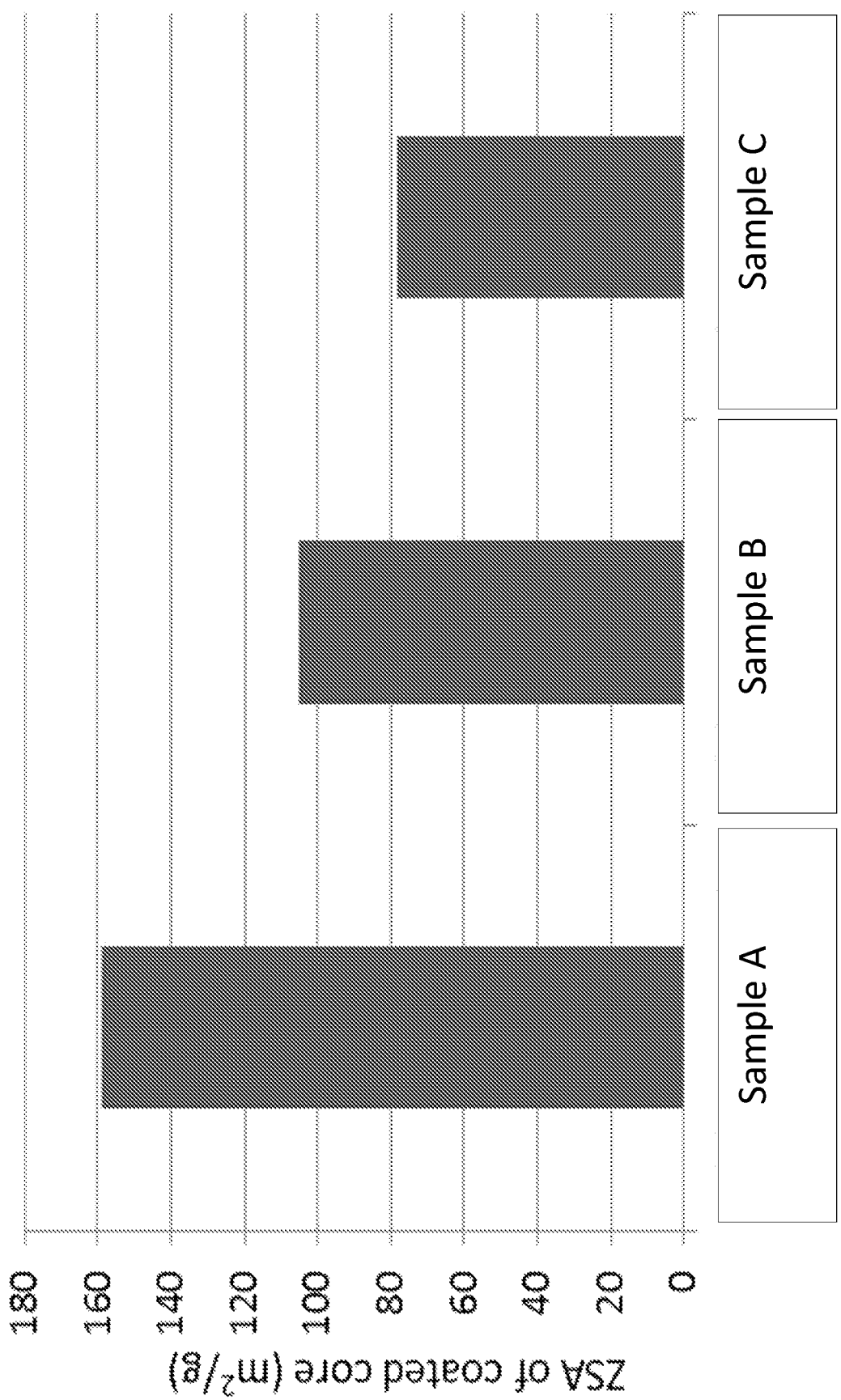
FIG. 3 is a graph providing ZSA values for the catalyst compositions of FIG. 2.
Figure 4:
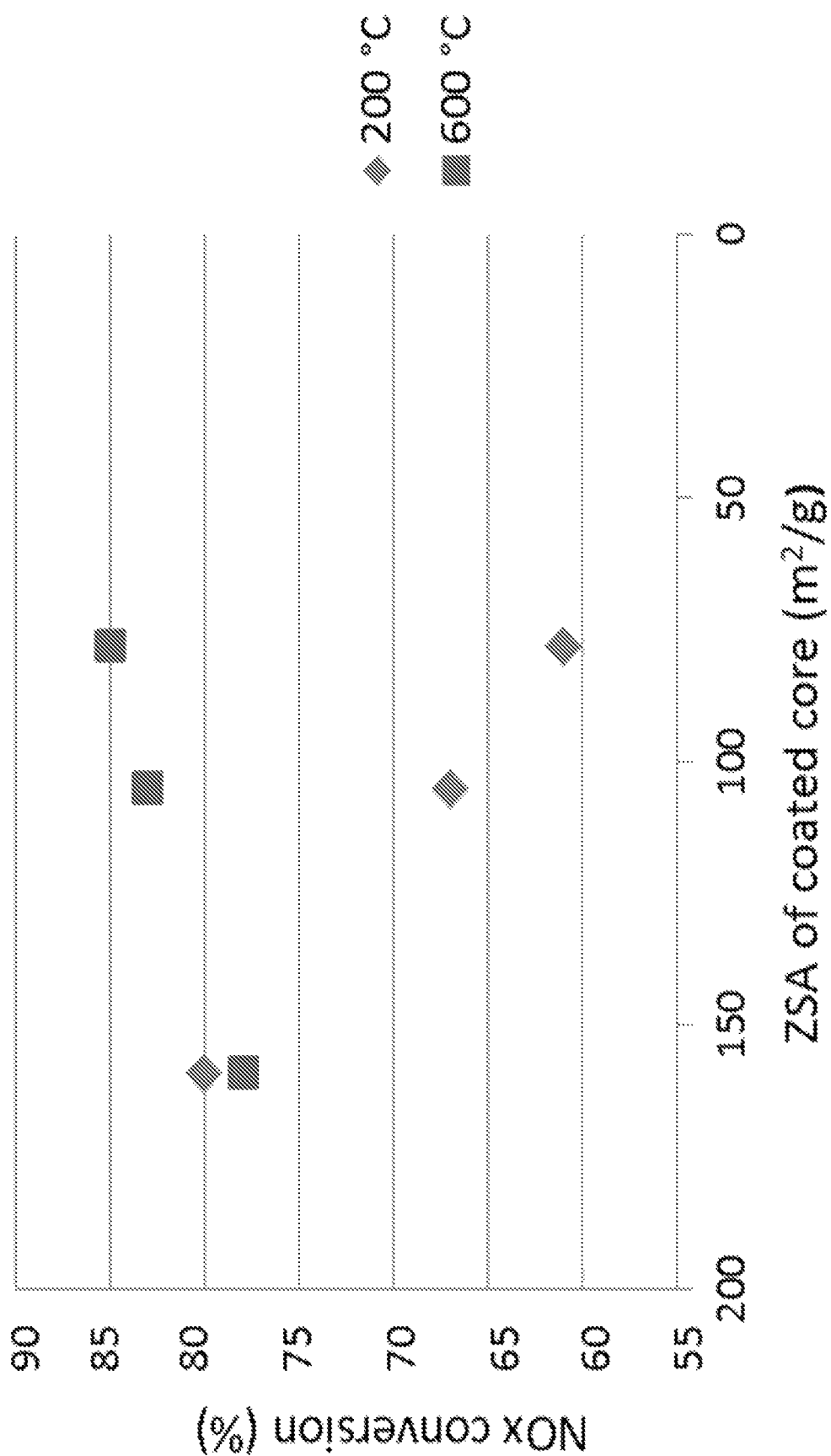
FIG. 4 is a plot showing correlation between the ZSA values of FIG. 3 and the $NO_x$ conversion shown in FIG. 2.

The samples (Samples A-C) exhibited significantly different ZSA values, as shown in FIG. 3. Of Samples A-C, Sample A exhibited the greatest ZSA value (and, from FIG. 2, the highest $NO_x$ conversion at low temperature, i.e., 200° C.). Sample C exhibited the lowest ZSA value (and, from FIG. 2, the lowest $NO_x$ conversion at low temperature, i.e., 200° C.). Based on this data of FIGS. 2 and 3, a plot correlating $NO_x$ conversion with ZSA of the coated cores was prepared, provided as FIG. 4.

Example 6—SCR Performance Correlated to the Total ZSA (tZSA) and Volumetric ZSA of the Tested Core Following the procedure described in Example 2, a series of coated catalysts was prepared using 400 and 600 cpsi substrates with wall thicknesses of 3 to 6 mils and washcoat loadings of 1.7-3.4 g/in³. Copper loading ranged from 3 to 6% by weight as CuO. Approximate volume of the coated and tested cores (see Example 2) was 1.3 in³.

In this Example, the cores were aged at temperatures from 650 to 800° C., and were evaluated after the SCR test for the 'total core ZSA (tZSA)' expressed in m². In this test, the previously described core ZSA reported in m²/g is multiplied by the total weight of the tested core to yield tZSA in m². As mentioned above, the approximate volume of all cores in this Example was about 1.3 in³, and the cores were also evaluated for Volumetric ZSA (as defined herein), expressed in m²/in³ of the tested catalyst article (see Table 4).

TABLE 4

$NO_x$ conversion as a function of total core ZSA (tZSA) and Volumetric ZSA of the tested catalyst article (approximate volume of all cores is 1.3 in³)

| Sample # | $NO_x$ Conversion at 200° C. (%) | Total core ZSA (tZSA) (m²) | Volumetric ZSA (m²/in³) |
|---|---|---|---|
| 1 | 30 | 447 | 344 |
| 2 | 56 | 985 | 758 |
| 3 | 66 | 1234 | 949 |
| 4 | 70 | 1217 | 936 |
| 5 | 78 | 1303 | 1002 |
| 6 | 81 | 1350 | 1038 |
| 7 | 88 | 2168 | 1668 |
| 8 | 88 | 2310 | 1777 |
| 9 | 90 | 2238 | 1722 |

This data demonstrates that, even with varying CuO content, substrate cell density and wall thickness, and washcoat loading, the total core ZSA (tZSA) and/or Volumetric ZSA of the tested core is the key factor affecting low temperature $NO_x$ conversion. Thus, it is highly beneficial and preferred to achieve maximum possible total core ZSA (tZSA) and/or Volumetric ZSA of the finished coated catalyst for the best $NO_x$ conversion.

While the invention herein disclosed has been described by means of specific embodiments and applications thereof, numerous modifications and variations could be made thereto by those skilled in the art without departing from the scope of the invention set forth in the claims. Furthermore, various aspects of the invention may be used in other applications than those for which they were specifically described herein.

What is claimed:

1. A catalyst article for diesel $NO_x$ abatement, comprising:
   a substrate; and
   a washcoat layer coated on the substrate,
   wherein the washcoat layer comprises metal-promoted molecular sieves, and
   wherein the zeolitic surface area (ZSA) of the catalyst article is about 100 m²/g or greater.

2. The catalyst article of claim 1, wherein the ZSA of the catalyst article is about 120 m²/g or greater.

3. The catalyst article of claim 1, wherein the ZSA of the catalyst article is about 130 m²/g or greater.

4. The catalyst article of claim 1, wherein the ZSA of the catalyst article is about 100 m²/g to about 600 m²/g.

5. The catalyst article of claim 1, wherein the ZSA of the catalyst article is about 120 m²/g to about 200 m²/g.

6. A catalyst article for diesel NO, abatement, comprising:
   a substrate; and
   a washcoat layer coated on the substrate,
   wherein the washcoat layer comprises metal-promoted molecular sieves, and
   wherein the volumetric zeolitic surface area of the catalyst article is about 900 m²/in³ or greater.

7. The catalyst article of claim 6, wherein the volumetric zeolitic surface area of the catalyst article is about 1000 m²/in³ or greater.

8. The catalyst article of claim 6, wherein the volumetric zeolitic surface area of the catalyst article is about 1500 m²/in³ or greater.

9. The catalyst article of claim 6, wherein the volumetric zeolitic surface area of the catalyst article is about 900 m²/in³ to about 5100 m²/in³.

10. The catalyst article of claim 6, wherein the volumetric zeolitic surface area of the catalyst article is about 1100 m²/in³ to about 2300 m²/in³.

11. The catalyst article of claim 6, wherein the volumetric zeolitic surface area of the catalyst article is about 1500 $m^2/in^3$ to about 2300 $m^2/in^3$.

12. A catalyst article for diesel NO, abatement, comprising:
a substrate; and
a washcoat layer coated on the substrate,
wherein the washcoat layer comprises metal-promoted molecular sieves, and
wherein the total zeolitic surface area (tZSA) of the catalyst article is about 1200 $m^2$ or greater.

13. The catalyst article of claim 12, wherein the tZSA of the catalyst article is about 1500 $m^2$ or greater.

14. The catalyst article of claim 12, wherein the tZSA of the catalyst article is about 2000 $m^2$ or greater.

15. The catalyst article of claim 12, wherein the tZSA of the catalyst article is about 2200 $m^2$ or greater.

16. The catalyst article of claim 12, wherein the tZSA of the catalyst article is about 1000 to about 6600 $m^2$.

17. The catalyst article of claim 12, wherein the tZSA of the catalyst article is about 1500 $m^2$ to about 3000 $m^2$.

18. The catalyst article of clai 2, wherein the tZSA of the catalyst article is about 2000 $m^2$ to about 3000 $m^2$.

19. The catalyst article of claim 1, wherein the metal-promoted molecular sieves comprise copper-promoted molecular sieves.

20. The catalyst article of claim 19, wherein the copper-promoted molecular sieves comprise about 0.1 wt. % or more copper, calculated as copper oxide.

21. The catalyst article of claim 19, wherein the copper-promoted molecular sieves comprise about 0.1 wt. % to about 7 wt. % copper, calculated as copper oxide.

22. The catalyst article of claim 1, wherein the metal-promoted molecular sieves comprise molecular sieves promoted with copper and a second, different metal.

23. The catalyst article of claim 22, wherein the second, different metal is selected from the group consisting of iron, cerium, zinc, strontium, and calcium.

24. The catalyst article of claim 1, wherein the metal-promoted molecular sieves comprise copper- and iron-promoted molecular sieves.

25. The catalyst article of claim 1, wherein the metal-promoted molecular sieves have a zeolitic structure type selected from the group consisting of AEI, AFT, AFV, AFX, AVL, CHA, DDR, EAB, EEI, ERI, IFY, IRN, KFI, LEV, LTA, LTN, MER, MWF, NPT, PAU, RHO, RTE, RTH, SAS, SAT, SAV, SFW, TSC, UFI, and combinations thereof.

26. The catalyst article of claim 1, wherein the metal-promoted molecular sieves have a zeolitic structure type of CHA.

27. The catalyst article of claim 26, wherein the CHA structure type is selected from the group consisting of SSZ-13, SSZ-62, natural chabazite, zeolite K-G, Linde D, Linde R, LZ-218, LZ-235, LZ-236, ZK-14, SAPO-34, SAPO-44, SAPO-47, and ZYT-6.

28. The catalyst article of claim 1, wherein the washcoat layer is present with a loading of about 0.5 $g/in^3$ to about 6 $g/in^3$.

29. The catalyst article of claim 1, wherein the substrate is a flow-through honeycomb substrate.

30. The catalyst article of claim 1, wherein the substrate is a wall flow filter substrate.

31. The catalyst article of claim 1, wherein the catalyst article is effective to provide a $NO_x$ conversion of about 70% or greater at 200° C.

32. The catalyst article of claim 1, wherein the catalyst article is in aged form such that the catalyst article has been aged at a temperature of at least 400° C. for at least 2 hours.

* * * * *